(12) United States Patent
Tanabe et al.

(10) Patent No.: US 6,274,098 B1
(45) Date of Patent: Aug. 14, 2001

(54) APPARATUS FOR THE TREATMENT OF EXHAUST GASES BY COMBINING HYDROGEN AND OXYGEN

(75) Inventors: Yoshikazu Tanabe, Tokyo; Yukio Minami, Osaka; Koji Kawada, Osaka; Nobukazu Ikeda, Osaka; Akihiro Morimoto, Osaka; Keiji Hirao, Osaka, all of (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 09/225,575

(22) Filed: Jan. 5, 1999

(30) Foreign Application Priority Data

Jan. 6, 1998 (JP) .................................................. 10-000884

(51) Int. Cl.[7] ....................................................... B01J 8/00
(52) U.S. Cl. ............................ 422/177; 422/171; 422/172
(58) Field of Search ..................................... 422/171, 172, 422/174, 159, 177; 423/580.1

(56) References Cited

U.S. PATENT DOCUMENTS 1,692,916  * 11/1928  Woodruff .
4,008,050  *  2/1977  Betz ...................................... 422/192
4,178,760  * 12/1979  Alf et al. .
6,093,662  *  7/2000  Ohmi et al. ........................... 438/773

FOREIGN PATENT DOCUMENTS

98/57884  * 12/1998  (WO) .

* cited by examiner

*Primary Examiner*—Hien Tran
(74) *Attorney, Agent, or Firm*—Griffin & Szipl, P.C.

(57) ABSTRACT

An apparatus for the treatment of exhaust gases containing hydrogen which permits always stable treatment with certainty of the exhaust gases from a semiconductor manufacturing line or the like irrespective of violent fluctuations in the flow rate of the exhaust gases, without having adverse effects on the operation of the semiconductor manufacturing line. The apparatus comprises: an ejector-type vacuum generator having a suction port connected to the discharge source of exhaust gases containing hydrogen and having a drive fluid supply port connected to an oxygen supply source, a hydrogen-oxygen reactor provided with a catalyst and connected to a drive fluid discharge port of the vacuum generator, and a drain reservoir connected to an outlet of the reactor for storing water discharged therefrom.

5 Claims, 5 Drawing Sheets

APPARATUS FOR THE TREATMENT OF EXHAUST GASES BY COMBINING HYDROGEN AND OXYGEN

FIELD OF THE INVENTION

This invention relates to improvements in an apparatus for the treatment of exhaust gases containing hydrogen, in particular exhaust gases from facilities and equipment such as semiconductor manufacturing plants and chemical plants that employ hydrogen in their processes.

BACKGROUND OF THE INVENTION

Exhaust gases containing hydrogen from facilities and plants such as semiconductor manufacturing facilities and chemical plants are generally disposed of by burning at high temperatures in incinerators. FIG. 5 shows a typical prior art high-temperature combustion disposal apparatus used in semiconductor manufacturing facilities. In this apparatus, exhaust gas A containing hydrogen from semiconductor manufacturing line B, which includes a hydrogen annealing furnace, is first led into a quartz furnace 50 containing an ignition silicon chip 52 which is heated by a heating lamp 53. Hydrogen in the exhaust gas A gushing out of a nozzle 51 is then subject to complete combustion at approximately 1800 to 2000° C. in the quartz furnace 50.

Quartz furnace 50 has another pipe 54 connected thereto. Oxygen is fed into the quartz furnace 50 through the pipe 54 to assist in complete combustion of the hydrogen. In order to ensure complete combustion of the hydrogen and to ensure safety, the amount of oxygen to be fed into the furnace is set at more than half of the amount of hydrogen.

In treatment of exhaust gases containing hydrogen by an external combustion unit C as shown in FIG. 5, the exhaust gas A can be burned completely with high efficiency in a relatively small external combustion unit C, provided that the exhaust gas A containing hydrogen flows from the semiconductor manufacturing line B at a nearly fixed rate and that the concentration of hydrogen in the exhaust gas A does not fluctuate too much. However, the disposal technique employing the aforesaid external combustion unit C has a fundamental drawback in that unstable combustion due to fluctuations in the discharge amount of exhaust gas A or changes in the concentration of hydrogen in the exhaust gas A could result in an explosion of the external combustion unit C.

If, for instance, the flow rate of exhaust gas A containing hydrogen from the semiconductor manufacturing line decreases, with the level of hydrogen dropping and staying at almost nil longer than a specific time, then the combustion flame near the tip of the nozzle 51 will go out, with the temperature dropping near the tip of the nozzle 51. Unless ignition silicon chip 52 is heated again, combustion will not be resumed, even when the flow rate of the exhaust gas A and the concentration of hydrogen rise again. Hydrogen-containing gas A would then be discharged untreated out of the combustion unit C, bringing about a very dangerous situation.

Another problem is that if the discharge rate of exhaust gas A drops substantially, backfire may spread toward the semiconductor manufacturing line B from the external combustion unit C through the pipe line 55. In this circumstance, there will arise a danger of explosion of the semiconductor manufacturing line B itself.

To ensure safety, the prior art combustion unit C is equipped as a matter of course with various safety measures. The safety measures include an alarm, an automatic igniter, and an automatic gas shutoff device that will work when the combustion flame of the mixed gas from nozzle 51 goes out. But if those safety measures are actuated each time the combustion flame in the external combustion unit C goes out or the combustion becomes unstable, operation of the semiconductor manufacturing line B will be affected, which can have an adverse effect on the quality of semiconductor products.

In another environment, at nuclear power stations, when the reactor coolant water is decomposed by radiation, a hydrogen-oxygen mixture is generated in the coolant water. This hydrogen-oxygen mixture is recombined using a catalyst. The principle of that recombination technique as disclosed in unexamined Japanese patent application 57-049895 is this, with reference to FIG. 6: The hydrogen-oxygen mixture A separated by an air extractor D from coolant water E is first mixed with a large quantity of steam S to produce a mixture $A_0$ whose concentration of hydrogen is below the explosion limit. This mixture $A_0$ is then led to a recombiner 60 including a catalyst unit 61 provided therein through an upper nozzle 62 where hydrogen and oxygen are recombined into steam through catalytic action at a specific high temperature. The steam thus produced is then discharged through a lower nozzle 63.

However, the technique outlined in FIG. 6 is for the treatment of large quantities of a mixture fluid $A_0$ mixed with large quantities of steam S. The recombiner 60 becomes so large in size that it is difficult to install in semiconductor manufacturing facilities. In addition, because the rate of reaction between hydrogen and oxygen in the recombiner 60 is relatively low, unreacted hydrogen is discharged out of recombiner 60 through lower nozzle 63. A complete treatment of the unreacted hydrogen discharged from recombiner 60 in turn requires a separate external combustion unit, which means additional and substantial investment in equipment.

SUMMARY OF THE INVENTION

The present invention addresses the aforesaid problems encountered in the prior art treatment of gas containing hydrogen in facilities such as semiconductor manufacturing plants. Among those problems are:

(1) If the discharge amount of the exhaust gas containing hydrogen and the concentration of hydrogen in the exhaust gas fluctuate, combustion becomes unstable or combustion flames go out. As a result, the gas containing hydrogen can accumulate, resulting in explosion of the external combustion unit.

(2) There is danger that a backfire may spread from the external combustion unit into the semiconductor manufacturing line, causing damage to the facilities when the discharge amount of the gas containing hydrogen decreases.

(3) Unstable combustion in the external combustion unit could affect the operation of the semiconductor manufacturing line, lowering production efficiency or causing non-uniformity in product quality.

It is an object of the present invention to provide an apparatus for the treatment of exhaust gases containing hydrogen, which apparatus permits complete treatment of gases containing hydrogen from a semiconductor manufacturing line on a constant and steady basis regardless of the flow rate, i.e., the discharge rate of the gases, and regardless of the concentration of hydrogen therein, such that the treatment proceeds without adverse effects on the semiconductor manufacturing line and with no need for mixing the exhaust gases containing hydrogen with steam or the like for dilution.

The present invention in a first embodiment provides an apparatus for the treatment of exhaust gases containing hydrogen, which apparatus comprises an ejector-type vacuum generator having a suction port connected to a discharge source of exhaust gases containing hydrogen and having a drive fluid supply port connected to an oxygen supply source, a hydrogen-oxygen reactor provided with a catalyst and connected to a drive fluid discharge port of the vacuum generator, and a drain reservoir connected to an outlet of the reactor for storing water discharged from the reactor. A second hydrogen-oxygen reactor provided with a catalyst and connected to an outlet port of the drain reservoir and a second drain reservoir connected to an outlet of the second reactor for storing water discharged from the second reactor may be additionally provided.

The present invention in another embodiment provides an apparatus for the treatment of exhaust gases containing hydrogen, which apparatus comprises an ejector-type vacuum generator having a suction port connected to a discharge source of exhaust gases containing hydrogen and having a drive fluid supply port connected to an oxygen or air supply source, a hydrogen-oxygen reactor provided with a catalyst and connected to a drive fluid discharge port of the vacuum generator, a drain reservoir or heat exchanger connected to an outlet of the reactor for storing water discharged therefrom, a second ejector-type vacuum generator having a suction port connected to a mixture fluid outlet side of the drain reservoir or the heat exchanger and having a drive fluid supply port connected to an oxygen or air supply source, a second hydrogen-oxygen reactor provided with a catalyst and connected to a drive fluid discharge port of the second vacuum generator, and a third vacuum generator having a suction port connected to a mixture fluid outlet side of the second reactor and having a drive fluid supply port connected to a nitrogen or air supply source.

In all of the above apparatuses, there may also be provided a backflow check, which may be one or more orifice plates inserted in the flow path, on the connecting pipe between the discharge source of exhaust gases containing hydrogen and the suction port of the vacuum generator.

In all of the above apparatuses, the reactor may be so configured that a reactor structural component provided with a gas feed port and another reactor structural component provided with a moisture take-out port are placed opposite each other and united to form the reactor wherein there are provided, in the interior space, an inlet side reflector unit, an outlet side reflector unit, and a diffusion filter and wherein the reactor structural component having the moisture take-out port is provided with a catalyst.

In all of the above apparatuses, the catalyst may be a platinum-coated catalyst layer provided on an inside wall of the reactor structural component.

DESCRIPTION OF PREFERRED EMBODIMENTS

Certain preferred embodiments of the present invention are described with reference to the drawings.

Figure 1:
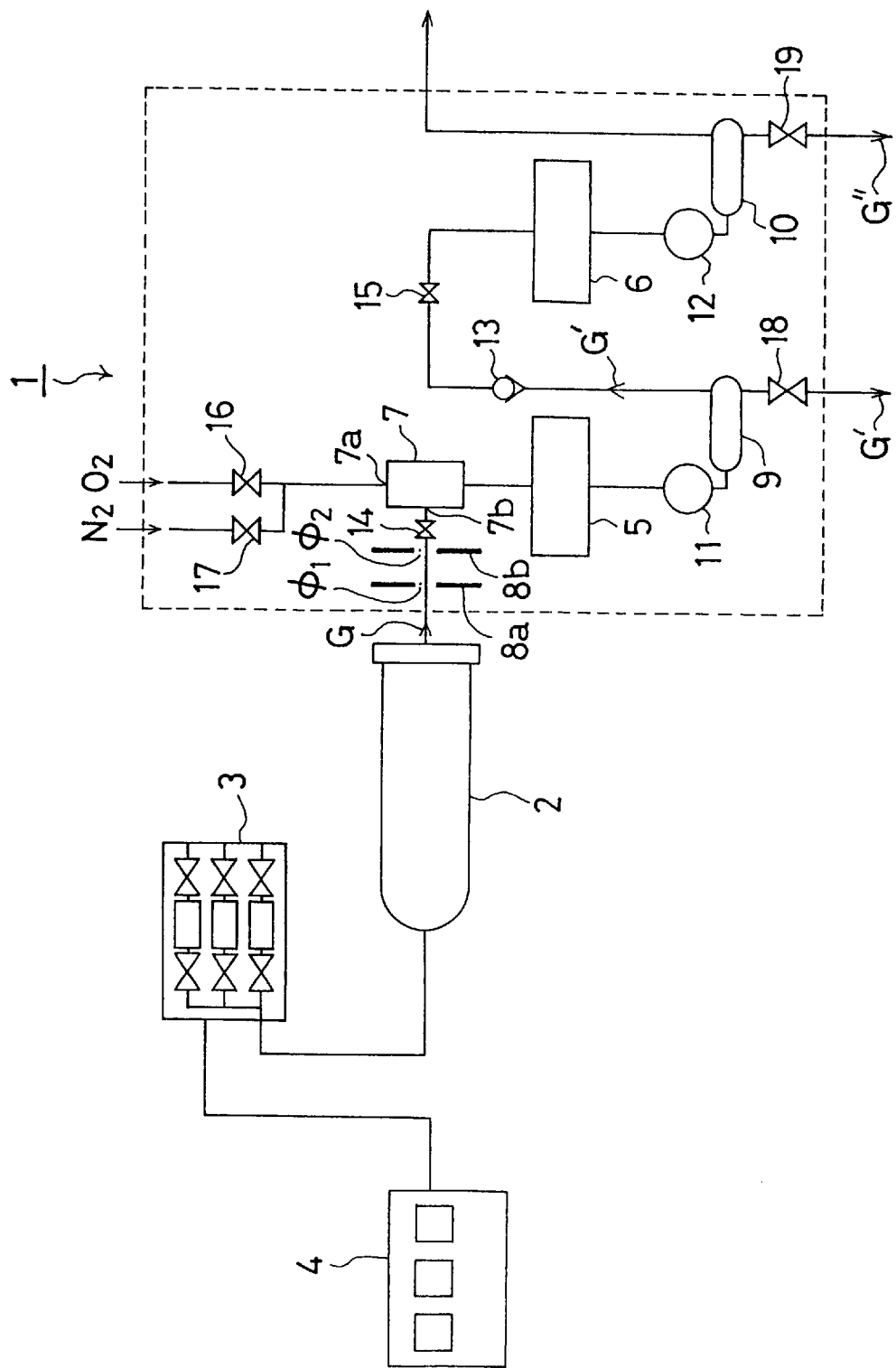
FIG. 1 is a system diagram of the apparatus for the treatment of exhaust gases containing hydrogen in which the present invention is applied to a semiconductor manufacturing line.

FIG. 1 shows a configuration example of an apparatus for the treatment of exhaust gases containing hydrogen according to the present invention, applied to a semiconductor manufacturing line. In FIG. 1, reference numeral 1 indicates the apparatus for the treatment of exhaust gases containing hydrogen; 2, a hydrogen annealing furnace forming part of the semiconductor manufacturing line and serving as a discharge source of the gases containing hydrogen; 3, a gas supply system; and 4, a gas supply system control.

Hydrogen annealing furnace 2, serving as a discharge source of exhaust gases containing hydrogen, is a heating furnace with an internal pressure increased by 50 to 100 mm water with respect to atmospheric pressure. The annealing furnace 2 shown in FIG. 1 has an internal volume of approximately 10 liters, with a temperature of about 800° C. and an internal pressure set to approximately 50 mm water.

In FIG. 1, the apparatus 1 for the treatment of exhaust gases containing hydrogen according to the present invention is applied to an annealing furnace 2 which is part of a semiconductor manufacturing line. Needless to say, this apparatus 1 is also applicable to other sources of exhaust gases containing hydrogen, such as chemical plants.

Referring to FIG. 1, the apparatus 1 for the treatment of exhaust gases containing hydrogen comprises reactors 5 and 6, a vacuum generator 7, backflow checks 8a and 8b, drain reservoirs 9 and 10, hydrogen concentration meters 11 and 12, a check valve 13, and control valves 14 and 15. The principle, which will be described below in detail, is this: gas G containing hydrogen is drawn into reactor 5 from the hydrogen annealing furnace 2 by means of vacuum produced by vacuum generator 7. Hydrogen in exhaust gas G is allowed to react with oxygen to become water in reactors 5 and 6.

In FIG. 1, reference numeral 16 indicates a supply valve for oxygen gas or a mixture of oxygen and nitrogen connected to an oxygen gas supply source (not shown): 17 indicates a supply valve for nitrogen to a nitrogen gas source (not shown); and 18 and 19 indicate drain valves.

Figure 2:
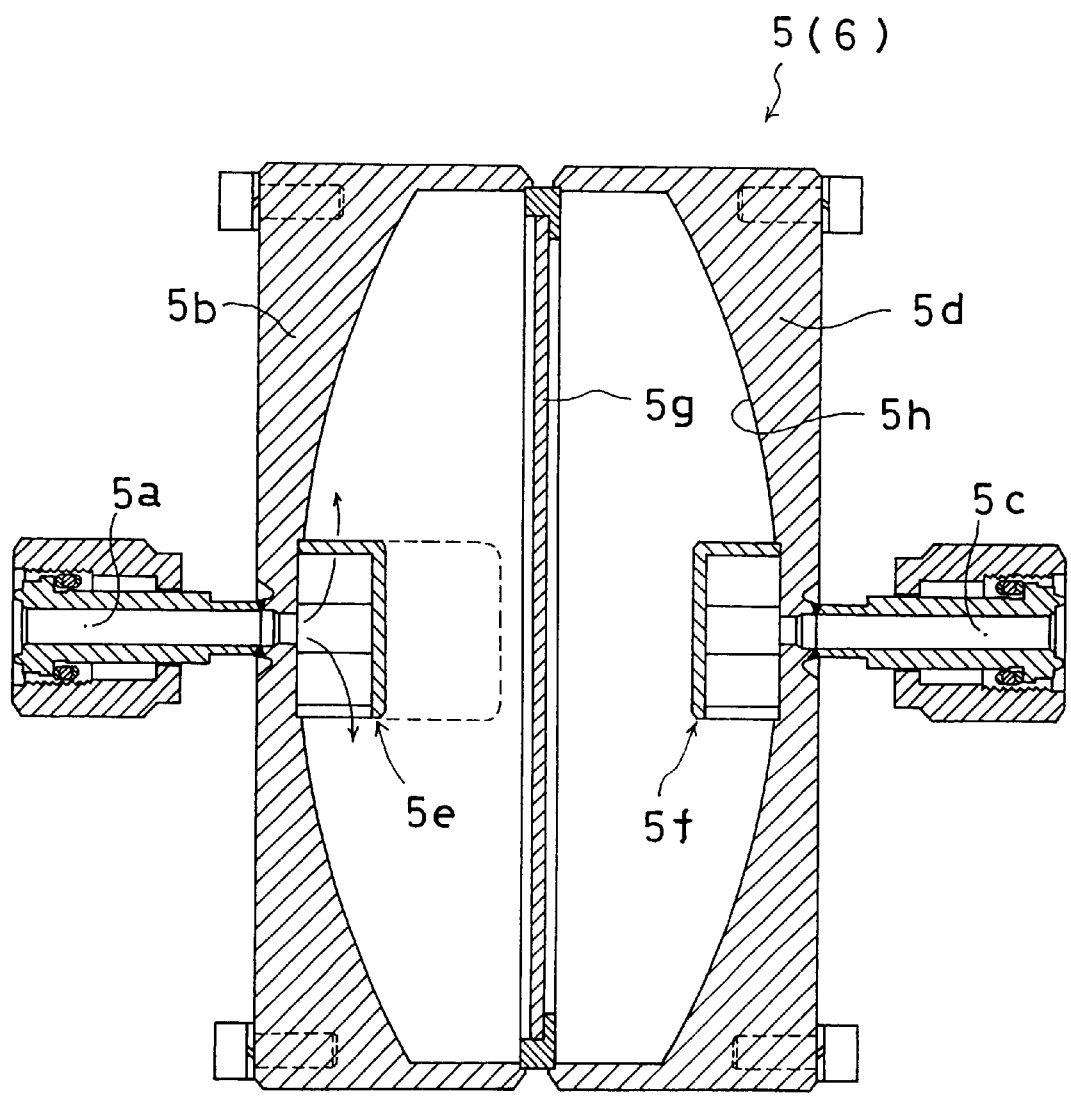
FIG. 2 is a vertical, sectional view of an example of a reactor used in the apparatus for the treatment of exhaust gases containing hydrogen according to the present invention.

Reactors 5 and 6 are each formed of a reactor structural component 5b provided with a gas feed port 5a and a reactor structural component 5d provided with a moisture gas take-out port 5c. The two components 5b and 5d are placed opposite each other and combined to form the reactor. In the interior space of the reactor, an inlet reflector unit 5e, an outlet reflector unit 5f, and a diffusion filter 5g are provided, and a to platinum-coated catalyst layer 5h is formed on the inner wall of the reactor structural component 5d, as shown in FIG. 2.

The reactors 5 and 6 are the same as the one which the present inventors have already disclosed in Japanese patent application filing No. 08-242246, PCT-JP97/100188 and others. More detailed description of the reactors is omitted in the present specification.

Vacuum generator 7 is a so-called ejector-type vacuum generator in which vacuum is produced at the suction port 7b as oxygen gas or a mixture of oxygen and nitrogen is supplied from the drive fluid supply port 7a. In FIG. 1, the pressure at the suction port 7b is reduced by more than approximately mm water from the pre-operation pressure level as the vacuum generator 7 operates.

Backflow checks 8a and 8b are orifices formed in plates. The bore Ø1 of the upstream orifice 8a and the bore Ø2 of the downstream orifice 8b have the same diameter. The backflow checks 8a and 8b serve to prevent the drive oxygen gas supplied from the oxygen gas supply source from flowing back to the discharge source of the exhaust gas containing hydrogen or the hydrogen annealing furnace 2. The orifice bores Ø1 and Ø2 reduce the sectional area of the gas flow path to raise the flow velocity of the exhaust gas G flowing from the hydrogen annealing furnace 2, thereby preventing the oxygen gas from flowing back. In FIG. 1, two orifice plates 8a and 8b are used. One or more than two orifice plates may likewise be used. Also, while in FIG. 1 two orifices with identical bore diameters are used as backflow checks 8a and 8b, the orifices may be different in bore diameter. Moreover, instead of orifices, valves or the like may be utilized to reduce the section area of the flow path.

Drain reservoirs 9 and 10 are to condense steam discharged from the reactors 5 and 6. Steam condenses into water on the inside walls of the drain reservoirs and the condensed water is stored therein.

Operation of the apparatus for the treatment of exhaust gases containing hydrogen according to the present invention will now be described.

In starting up the apparatus, the oxygen supply valve 16 is first opened and a specific flow rate of oxygen is fed into drive fluid supply port 7a. As oxygen is supplied, a vacuum is produced in suction port 7b. As the control valve 14 is opened, exhaust gas G containing hydrogen is sucked from hydrogen annealing furnace 2 into vacuum generator 7. The sucked exhaust gas G containing hydrogen is led into reactor 5 along with oxygen coming from the oxygen supply valve 16. Those gases collide with inlet reflector 5e and diffuse into the interior space of reactor structural component 5b. They are further diffused uniformly by filter 5g before entering reactor structural component 5d on the outlet side.

Hydrogen and oxygen in the mixture fluid diffused into the interior space of reactor structural component 5d on the outlet side come into contact with the high temperature platinum-coated catalyst layer 5h provide on the inside wall of reactor structural component 5d. Upon contact with that catalyst layer, hydrogen and oxygen are radicalized by catalytic action and instantaneously react to produce water. The water produced turns into steam and is discharged along with residual oxygen gas into drain reservoir 9 through the moisture gas take-out port 5c of reactor 5, condensed into the liquid form, and stored therein.

The rate of reaction between hydrogen and oxygen in reactor 5 is approximately 70 to 98 percent. In the case where the mixing ratio of hydrogen to oxygen in reactor 5 is 2:1 or 1:1, the rate of reaction rises to approximately 98 percent and the amount of unreacted hydrogen in the exhaust gas G' from the drain reservoir 9 is so low as to be negligible.

In cases in which the flow rate or the hydrogen concentration in the exhaust gas containing hydrogen G from the hydrogen annealing furnace 2 fluctuates greatly, the volumetric ratio between hydrogen and oxygen flowing into the reactor 5 naturally changes greatly, and consequently so does the rate of reaction between hydrogen and oxygen in reactor 5. This holds true also with the case where the flow rate into the reactor 5 of oxygen, hydrogen, or water mixture gas suddenly increases. The rate of reaction between hydrogen and oxygen drops below the set level, and the concentration of hydrogen in the exhaust gas G' from the drain reservoir 9 rises.

In such cases, exhaust gas G' is sent to the second reactor 6 through check valve 13. In the second reactor 6, residual hydrogen and oxygen react by catalytic action and become water. Thus, the unreacted hydrogen in the exhaust gas G" from drain reservoir 10 decreases to an almost negligible level.

It is noted that there is much fluctuation in the amount of exhaust gas G containing hydrogen, the concentration of hydrogen in the exhaust G from the hydrogen annealing furnace, and/or the pressure inside the furnace, depending on the operating conditions of the hydrogen annealing furnace 2. Since, however, the outlet side of the hydrogen annealing furnace is always maintained at a specific degree of vacuum, the exhaust gas G is always smoothly led into reactor 5 regardless of the operating conditions of the hydrogen annealing furnace 2.

In addition, backflow checks 8a and 8b are provided on the outlet side of the hydrogen annealing furnace 2 to raise the flow velocity of the exhaust gas G flowing through the flow path. Even if, therefore, the flow rate of the exhaust gas G or the pressure within the annealing furnace should change suddenly, there will be no possibility that the drive fluid oxygen in the vacuum generator 7 flows back into the hydrogen annealing furnace 2.

Figure 3:
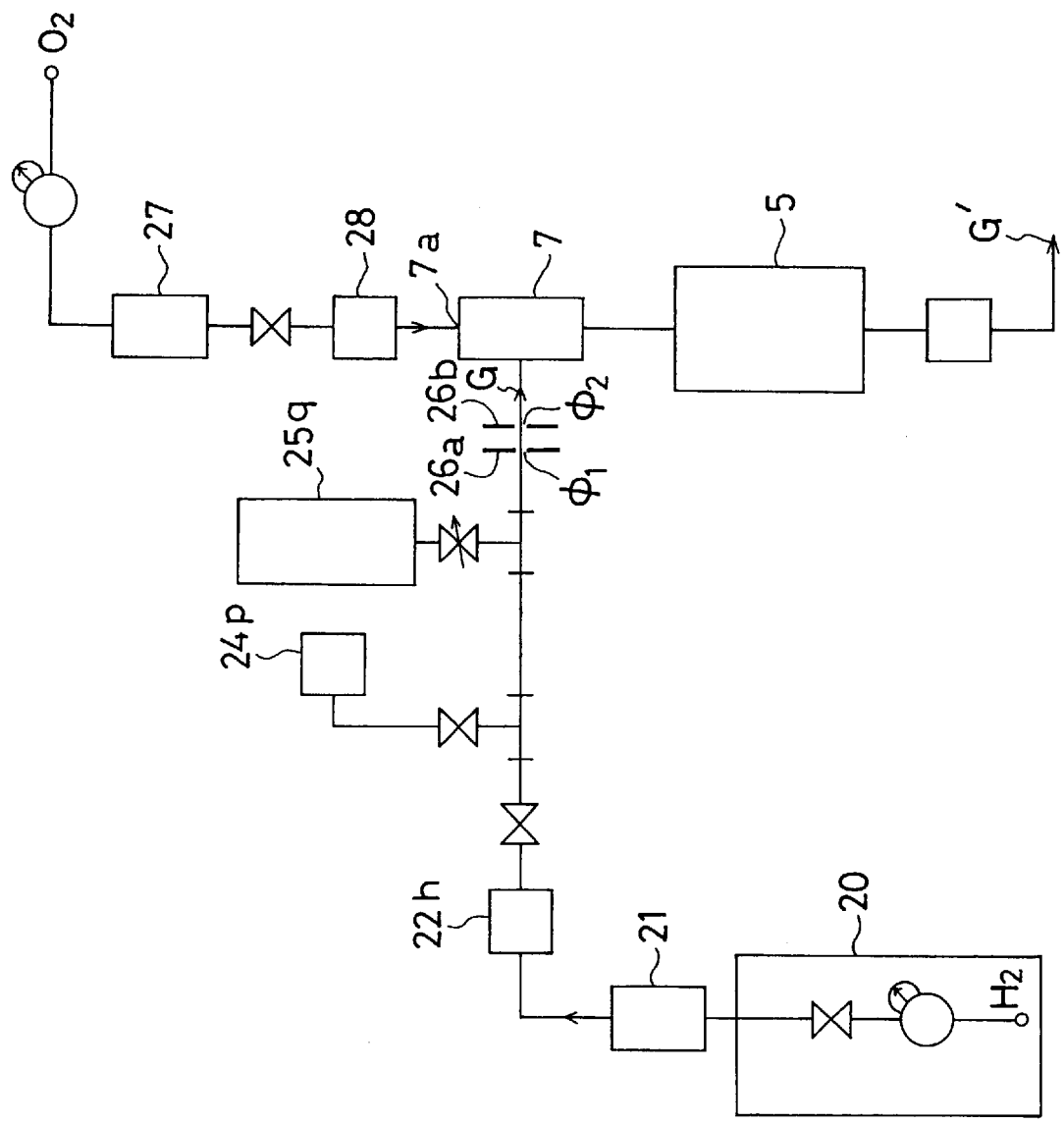
FIG. 3 is a system diagram of an arrangement for testing the apparatus for the treatment of exhaust gases containing hydrogen according to the present invention.

FIG. 3 shows a testing arrangement for the apparatus 1 for the treatment of exhaust gases containing hydrogen according to the present invention. The tester is provided with a hydrogen supply unit 20, which is a discharge source of the hydrogen-containing gas G, in place of the hydrogen annealing furnace 2. Hydrogen was fed to nerator 7 through a mass flow meter 21, a hydrogen concentration detector 22h, a pressure gauge 24p, a quadrupole mass spectrometer 25q, an orifice 26a (Ø1=1.0 mmØ), and an orifice 26b (Ø2=1.0 mmØ). Oxygen was fed to the drive fluid supply port 7a of the vacuum generator 7 through a mass flow meter 27 and a pressure gauge 28. The reactor 5 used was about 114 mmØ in outside diameter, approximately 31 mm in thickness, and 86 cc in interior space or internal volume, and was provided with an area of approximately 99 $cm^2$ of a platinum-coated catalyst layer. Table 1 shows the relationship between the flow rate and pressure of the gas G containing hydrogen, the concentration of hydrogen in the gas, the amount of oxygen fed into the vacuum generator 7, and the residual hydrogen concentration in the discharged from the reactor 5.

TABLE 1

| Exhaust gas containing hydrogen (G) | | Pressure at upstream side of orifice (mm water) | Amount of oxygen supplied to vacuum generator (SLM) | Hydrogen concentration of exhaust gas discharged from reactor (%) | Concentration of oxygen flowing back to hydrogen annealing furnace (%) |
|---|---|---|---|---|---|
| Flow rate (SLM) | Hydrogen concentration (%) | | | | |
| 2 | 20 | 10050 | 2 | 0.02 | <0.01 |
| 2 | 50 | 10050 | 2 | 0.03 | <0.01 |
| 2 | 100 | 10050 | 2 | 0.04 | <0.01 |
| 5 | 20 | 10200 | 5 | 0.04 | <0.01 |
| 5 | 50 | 10200 | 5 | 0.07 | <0.01 |
| 5 | 100 | 10200 | 5 | 0.09 | <0.01 |
| 10 | 20 | 10750 | 10 | 0.08 | <0.01 |
| 10 | 50 | 10750 | 10 | 0.14 | <0.01 |
| 10 | 100 | 10750 | 10 | 0.20 | <0.01 |

As is evident from Table 1, apparatus 1 can treat the exhaust gas G containing hydrogen continuously and smoothly on a stable basis regardless of large fluctuations in the flow rate of the gas G from its source and in the concentration of hydrogen contained therein.

EXAMPLES

Figure 4:
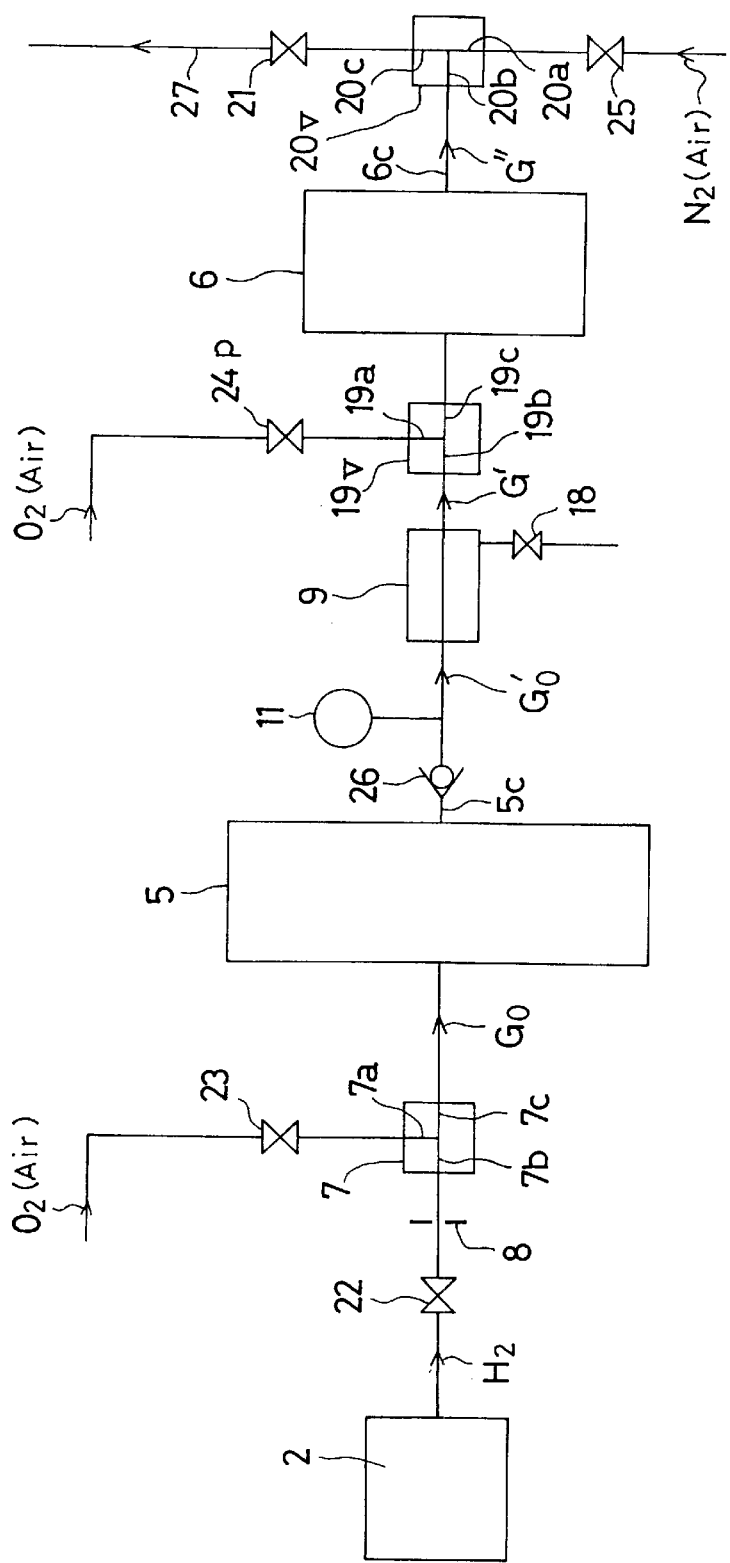
FIG. 4 is an example of the apparatus for the treatment of exhaust gases containing hydrogen according to the present invention.
Figure 5:
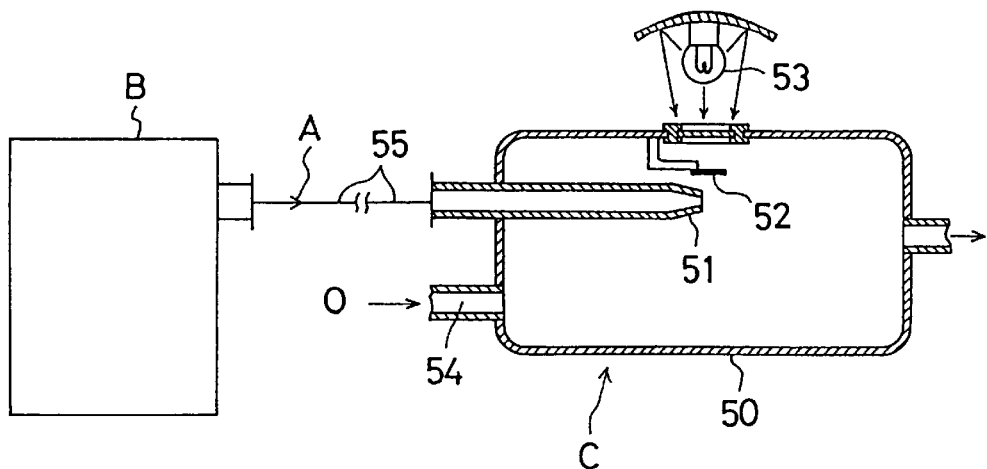
FIG. 5 is an example of the prior art high-temperature combustion disposal apparatus for the treatment of gases containing hydrogen.
Figure 6:
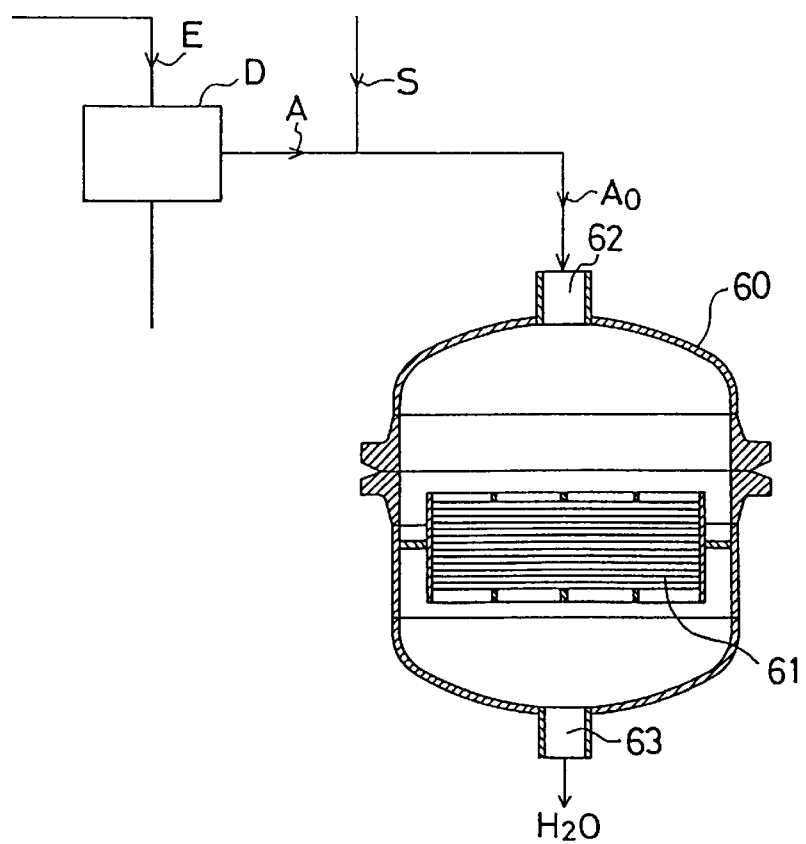
FIG. 6 is a prior art reactor for the catalytic reaction of hydrogen with oxygen.

FIG. 4 shows an example of the apparatus for the treatment of exhaust gases containing hydrogen according to the present invention. In this example, hydrogen from a processing chamber 2 or the like in a semiconductor manufacturing line flows into the suction port 7b of first vacuum generator 7 through valve 22 and orifice 8 at the rate of approximately 4 liters/minute. Oxygen or air is fed to the drive fluid supply port 7a of first vacuum generator 7 at the rate of approximately 2.4 liters/minute through the valve 23. Thus, hydrogen is sucked in from the suction port 7b, and a mixture fluid $G_0$ of hydrogen and of oxygen or air flows into first reactor 5 from outlet port 7c of the vacuum generator 7.

First reactor 5 is disk-shaped and about 228 mm in outside diameter and approximately 38 mm in thickness, with a moisture generating capacity of 4000 cc/minute. In this reactor, hydrogen and oxygen react and turn into moisture gas. The mixture fluid $G_0'$ of the moisture gas as obtained above and unreacted hydrogen and oxygen or air is then led into drain reservoir 9 through moisture gas take-out port 5c of first reactor 5 and check valve 26. The concentration of hydrogen in the aforesaid mixture fluid $G_0'$ is continuously monitored by a hydrogen concentration meter 11. Whenever the hydrogen concentration rises to the point where it falls within the explosion range, safety measure including an alarm will be actuated as a matter of course.

The present example uses a drain reservoir 9. A heat exchanger (not shown) may be used instead. Steam in the mixture fluid $G_0'$ which has flowed into the drain reservoir 9 condenses and is collected as the so-called drain therein, which is then discharged out through drain valve 18.

Mixture fluid G' which has been cleared of moisture gas and discharged from the drain reservoir 9 flows into the suction port 19b of the second vacuum generator 19v. Oxygen or air is fed to the drive fluid supply port 9a of second vacuum generator 19v through the valve 24. Thus, the mixture fluid G' is sucked in from the suction port 19b, and a mixture of the mixture fluid G' and oxygen or air flows into the second reactor 6 from the discharge port 19c.

Second reactor 6 is disk-shaped and about 114 mm in outside diameter and approximately 34 mm in thickness, with a moisture generating capacity of 1000 cc/minute. In this reactor 6, the unreacted hydrogen in the mixture fluid G' and oxygen react to become moisture gas.

Mixture fluid G" containing moisture discharged from moisture take-out port 6c of second reactor 6 flows into fluid suction port 20b of third vacuum generator 20v. Nitrogen or air is fed to the drive fluid supply port 20a of third vacuum generator 20v through a valve 25. Thus, the mixture fluid G" from the aforesaid suction port 20b is sucked in and mixed with nitrogen or air to be discharged out to the atmosphere from drive fluid discharge port 20c through a vent pipe 27 and a valve 21.

When the exhaust gas G1 is discharged into the atmosphere, the concentration of unreacted hydrogen has been reduced to less than several hundreds ppm, which poses no threat of damaging the environment in any way.

Effects of the Present Invention

It is so arranged in the present invention that the exhaust gases containing hydrogen are forced to be sucked in from a discharge source of those exhaust gases by means of an ejector-type vacuum generator, with oxygen gas serving as a drive fluid. The exhaust gases containing hydrogen sucked in in this manner are mixed with the drive fluid oxygen gas and the mixture so obtained is led into a reactor, where hydrogen and oxygen are allowed to react by catalytic action and turn into water. This system permits sucking and feeding the exhaust gases into the reactor irrespective of extreme changes in the flow rate of the exhaust gases and the concentration of hydrogen therein due to changes in the operating conditions at the discharge source of the gases containing hydrogen, thereby eliminating all various inconveniences encountered with the prior art external combustion unit.

In an enhancement of this novel method, a two-step treatment by two reactors permits a complete treatment of exhaust gases containing hydrogen discharged at a great flow rate. In a further enhancement, two reactors and three vacuum generators are employed, wherein the exhaust gases are diluted with a large amount of air or nitrogen gas and then discharged into the atmosphere. This method permits a more complete and safer treatment of exhaust gases containing hydrogen discharged at a great flow rate.

Another embodiment of the present invention raises the flow velocity of the flowing exhaust gases containing hydrogen by providing backflow checks in the flow path of the exhaust gases. That precludes the possibility of the drive fluid oxygen flowing back from the vacuum generator side, even if the flow rate of the exhaust gases drops. Orifices may be used as backflow checks, which permits size reduction and simplification of the backflow checks.

Also, the present invention may be so arranged that the reactor is provided in the interior space with an inlet reflector, an outlet reflector, and a diffusion filter, which permits treatment of a large amount of exhaust gases containing hydrogen at a high reaction rate by a small-size and small-capacity reactor, thereby substantially reducing the size of the apparatus for the treatment of exhaust gases containing hydrogen and lowering the treatment costs.

And, in accordance with the present invention, the reactor structural component may be provided with a platinum-coated catalyst layer on its inside wall, which permits substantial size reduction of the reactor and raises the rate of reaction between hydrogen and oxygen.

Thus, the present invention makes possible significant practical improvements in the treatment of exhaust gases containing hydrogen.

What is claimed is:

1. An apparatus for treating exhaust gases containing hydrogen, comprising:

an ejector vacuum generator having a suction port connected to a discharge source of exhaust gases containing hydrogen and having a drive fluid supply port connected to an oxygen supply source, a first hydrogen-oxygen reactor provided with a catalyst and connected to a drive fluid discharge port of said vacuum generator, a first drain reservoir connected to an outlet of said first reactor for storing water discharged from said first reactor, a second hydrogen-oxygen reactor provided with a catalyst and connected to an outlet port of said first drain reservoir, and a second drain reservoir connected to an outlet of said second reactor for storing water discharged from the second reactor, wherein said first reactor is configured so that a reactor structural component provided with a gas feed port and another reactor structural component provided with a moisture take-out port are placed opposite each other and united to form said first reactor, and wherein, in an interior space of said first reactor, an inlet side reflector unit, an outlet side reflector unit, and a diffusion filter are provided, and wherein the reactor structural component having the moisture take-out port is provided with a catalyst, and wherein a backflow check is provided in a connecting pipe between said discharge source of exhaust gases containing hydrogen and said suction port of said vacuum generator.

2. An apparatus for treating exhaust gases containing hydrogen, comprising:

a first ejector vacuum generator having a suction port connected to a discharge source of exhaust gases containing hydrogen and having a drive fluid supply port, a first hydrogen-oxygen reactor provided with a catalyst and connected to a drive fluid discharge port of the vacuum generator, a drain reservoir connected to an outlet of said first reactor for storing water discharged from said first reactor, a second ejector vacuum generator having a suction port connected to a mixture fluid outlet side of the drain reservoir and having a drive fluid supply port, means for supplying a gas selected from the group of gases consisting of oxygen and air to the drive fluid supply ports of said first and second vacuum generators, a second hydrogen-oxygen reactor provided with a catalyst and connected to a drive fluid discharge port of the second vacuum generator, and a third vacuum generator having a suction port connected to an outlet of the second reactor and having a drive fluid supply port connected to a nitrogen supply source, wherein said first reactor is configured so that a reactor structural component provided with a gas feed port and another reactor structural component provided with a moisture take-out port are placed opposite each other and united to form said first reactor, and wherein, in an interior space of said first reactor, an inlet side reflector unit, an outlet side reflector unit, and a diffusion filter are provided, and wherein the reactor structural component having the moisture take-out port is provided with a catalyst, and wherein a backflow check is provided in a connecting pipe between said discharge source of exhaust gases containing hydrogen and said suction port of said first vacuum generator.

3. An apparatus for treating exhaust gases containing hydrogen, comprising:

a first ejector vacuum generator having a suction port connected to a discharge source of exhaust gases containing hydrogen and having a drive fluid supply port, a first hydrogen-oxygen reactor provided with a catalyst and connected to a drive fluid discharge port of said first vacuum generator, a first drain reservoir connected to an outlet of said first reactor for storing water discharged from said first reactor, a second ejector vacuum generator having a suction port connected to a mixture fluid outlet side of said first drain reservoir and having a drive fluid supply port, means for supplying a gas selected from the group of gases consisting of oxygen and air to the drive fluid supply ports of said first and second vacuum generators, a second hydrogen-oxygen reactor provided with a catalyst and connected to a drive fluid discharge port of said second vacuum generator, a second drain reservoir connected to an outlet of said second reactor for storing water discharged from said second reactor, and a third vacuum generator having a suction port connected to an outlet of said second reactor and having a drive fluid supply port connected to a source of a gas selected from the group of gases consisting of nitrogen and air, wherein said first and second reactors are each configured so that a reactor structural component provided with a gas feed port and another reactor structural component provided with a moisture take-out port are placed opposite each other and united to form the reactor, and wherein, in an interior space of the reactor, an inlet side reflector unit, an outlet side reflector unit, and a diffusion filter are provided, and wherein the reactor structural component having the moisture take-out port is provided with a catalyst, and a backflow check comprising at least one orifice plate is provided in a connecting pipe between said discharge source of exhaust gases containing hydrogen and said suction port of said first vacuum generator.

4. An apparatus for treating exhaust gases containing hydrogen, comprising:

a first ejector vacuum generator having a suction port connected to a discharge source of exhaust gases containing hydrogen and having a drive fluid supply port, a first hydrogen-oxygen reactor provided with a catalyst and connected to a drive fluid discharge port of said first vacuum generator, a first drain reservoir connected to an outlet of said first reactor for storing water discharged from said first reactor, a second ejector vacuum generator having a suction port connected to a mixture fluid outlet side of said first drain reservoir and having a drive fluid supply port, means for supplying a gas selected from the group of gases consisting of oxygen and air to the drive fluid supply ports of said first and second vacuum generators, a second hydrogen-oxygen reactor provided with a catalyst and connected to a drive fluid discharge port of said second vacuum generator, a second drain reservoir connected to an outlet of said second reactor for storing water discharged from said second reactor, and a third vacuum generator having a suction port connected to an outlet of said second reactor and having a drive fluid supply port connected to a source of a gas selected from the group of gases consisting of nitrogen and air, wherein said first reactor is configured so that a reactor structural component provided with a gas feed port and another reactor structural component provided with a moisture take-out port are placed opposite each other and united to form the reactor, and wherein, in an interior space of the reactor, an inlet side reflector unit, an outlet side reflector unit, and a diffusion filter are provided, and wherein an inside wall of the reactor structural component having the moisture take-out port is provided with a platinum-coated catalyst layer, and a backflow check is provided in a connecting pipe between said discharge source of exhaust gases containing hydrogen and said suction port of said first vacuum generator.

5. An apparatus for treating exhaust gases containing hydrogen as claimed in claim 2, 3 or 4 wherein at least one of said first and second drain reservoirs comprises a heat exchanger.

* * * * *